(12) United States Patent
Darce et al.

(10) Patent No.: US 8,074,996 B2
(45) Date of Patent: Dec. 13, 2011

(54) PLASTIC PIPE SEALING GASKET AND PROCESS FOR BELLING PLASTIC PIPE

(75) Inventors: Gerardo Darce, Heredia (CR); Randall Chinchilla, San Jose (CR)

(73) Assignee: S & B Technical Products, Inc., Fort Worth, TX (US)

( * ) Notice: Subject to any disclaimer, the term of this patent is extended or adjusted under 35 U.S.C. 154(b) by 799 days.

(21) Appl. No.: 12/134,581

(22) Filed: Jun. 6, 2008

(65) Prior Publication Data

US 2008/0303220 A1    Dec. 11, 2008

Related U.S. Application Data

(60) Provisional application No. 60/933,542, filed on Jun. 6, 2007.

(51) Int. Cl.
*F16L 21/02*    (2006.01)
*F16L 17/03*    (2006.01)

(52) U.S. Cl. ........ 277/314; 277/609; 277/624; 277/626; 277/647; 277/651; 285/110; 285/374

(58) Field of Classification Search .................. 277/624, 277/626, 644, 647, 651, 314, 609, 611, 617; 285/374, 110
See application file for complete search history.

(56) References Cited

U.S. PATENT DOCUMENTS

| | | | | |
|---|---|---|---|---|
| 2,191,044 A | * | 2/1940 | Seligman | 165/167 |
| 2,330,425 A | * | 9/1943 | Hilton | 277/322 |
| 2,557,301 A | * | 6/1951 | Lundy | 279/46.9 |
| 2,767,444 A | * | 10/1956 | Spraragen | 277/641 |
| 2,789,844 A | * | 4/1957 | Kessler | 285/336 |
| 3,153,541 A | * | 10/1964 | Rudder | 277/639 |
| 3,186,042 A | * | 6/1965 | Daley | 277/651 |
| 3,493,236 A | * | 2/1970 | Kleindienst | 277/617 |
| 3,746,348 A | * | 7/1973 | Stone | 285/95 |
| 3,907,481 A | * | 9/1975 | Heisler | 425/393 |
| 3,918,726 A | * | 11/1975 | Kramer | 277/651 |
| 4,113,268 A | * | 9/1978 | Simmons et al. | 277/641 |
| 4,269,437 A | * | 5/1981 | Shaw et al. | 285/109 |
| 4,299,412 A | | 11/1981 | Parmann | 285/110 |
| 4,345,739 A | * | 8/1982 | Wheatley | 251/358 |
| 4,361,348 A | * | 11/1982 | Rapp et al. | 285/31 |
| 4,602,793 A | | 7/1986 | Andrick | 277/207 |
| 4,637,618 A | * | 1/1987 | Valls | 277/626 |
| 4,671,325 A | * | 6/1987 | Otter | 138/30 |
| 4,674,756 A | * | 6/1987 | Fallon et al. | 277/624 |
| 4,693,483 A | * | 9/1987 | Valls | 277/626 |
| 5,064,207 A | * | 11/1991 | Bengtsson | 277/616 |
| 5,624,227 A | * | 4/1997 | Farrell | 415/139 |
| 5,687,975 A | * | 11/1997 | Inciong | 277/591 |
| 5,988,695 A | * | 11/1999 | Corbett, Jr. | 285/110 |
| 6,027,123 A | * | 2/2000 | Berry et al. | 277/434 |
| 6,105,972 A | | 8/2000 | Guzowski | 277/604 |
| 6,113,159 A | * | 9/2000 | Corbett, Jr. | 285/345 |
| 6,152,494 A | | 11/2000 | Corbett, Sr. et al. | 285/110 |

(Continued)

*Primary Examiner* — Alison Pickard
(74) *Attorney, Agent, or Firm* — Charles D. Gunter, Jr.

(57) ABSTRACT

An sealing gasket is shown for use in forming joints of plastic pipe. The gasket has a bulbous region which is bisected by a planar region which forms a pair of oppositely extending wing-like flaps. These features of the gasket allow it to be more reliably seated on the working mandrel used to bell a female, thermoplastic pipe end. The wing-like flap portions of the gasket form wiper surfaces for a subsequently installed male, spigot pipe end as the joint is formed.

14 Claims, 4 Drawing Sheets

U.S. PATENT DOCUMENTS

| | | | |
|---|---|---|---|
| 6,299,176 B1 | 10/2001 | Guzowski et al. | 277/604 |
| 6,499,744 B1 | 12/2002 | Quesada | 277/609 |
| 6,572,118 B2 * | 6/2003 | Deeb et al. | 277/616 |
| 6,663,112 B1 * | 12/2003 | Sporre | 277/611 |
| 7,185,894 B2 | 3/2007 | Kish et al. | 277/616 |
| 2002/0153668 A1 | 10/2002 | Deeb et al. | 277/606 |
| 2007/0257448 A1 | 11/2007 | Corbett, Jr. | 277/602 |
| 2008/0007062 A1 | 1/2008 | Jones et al. | 285/374 |

* cited by examiner

PLASTIC PIPE SEALING GASKET AND PROCESS FOR BELLING PLASTIC PIPE

CROSS-REFERENCE TO RELATED APPLICATION

The present application claims priority from earlier filed provisional application Ser. No. 60/933,542, filed Jun. 6, 2007, entitled "Plastic Pipe Gasket and Process for Belling Plastic Pipe," by inventors Gerardo Darce and Randall Chinchilla.

BACKGROUND OF THE INVENTION

1. Field of the Invention

The present invention relates generally to sealing systems for thermoplastic pipes and, more specifically, to an improved pipe gasket and to an improved belling process for installing a gasket in a socket end of a thermoplastic pipe.

2. Description of the Prior Art

Pipes formed from thermoplastic materials including polyethylene and PVC are used in a variety of industries. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, the elastomeric gasket was inserted within an internal groove in the socket end of the female pipe as the female or belling end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint. These features increased the reliability of the joint and decreased the risk of leaks or possible failure due to abrasion or other factors. The Rieber process is described in the following issued U.S. Pat. Nos. 4,120,521; 4,061,459; 4,030,872; 3,965,715; 3,929,958; 3,887,992; 3,884,612; and 3,776,682.

In the Rieber process, the gasket is installed in a circumferential groove provided upon the working surface of a mandrel and abuts a backup collar which helps to position and retain the gasket during the subsequent belling operation. It is critical that the gasket be properly positioned on the forming mandrel and that the gasket not ride over the backup collar during the belling process.

With prior art gaskets used with the Rieber belling process, it was sometimes possible to reverse or otherwise mis-install the gasket in the circumferential groove provided on the outer working surface of the mandrel. When the heated thermoplastic pipe end was forced over the mandrel, the gasket would fail to be seated properly in the subsequently formed pipe groove within the female, belled pipe end. It was then generally necessary to discard the defective pipe section.

A need exists for an improved sealing gasket for use in a Rieber type manufacturing process, which sealing gasket would be easier and more reliable to seat on the working surface of the forming mandrel.

A need also exists for such a sealing gasket which would be simple in design and simple to manufacture and which could also be used with existing belling technologies.

A need also exists for such a sealing gasket which would simplify handling, which would help to insure correct position on the exterior surface of the working mandrel and which would thereby improve quality control in the pipe belling process.

A need also exists for such a sealing gasket which would effect a more stable bell shape in the subsequently formed female, belled pipe end.

A need also exists for such a gasket which would incorporate a wiping lip feature to wipe the male, spigot pipe end of dirt or other contamination upon subsequent assembly of a pipe joint.

SUMMARY OF THE INVENTION

The present invention has as its object to provide an improved sealing gasket, an improved pipe belling process, and an improved pipe assembly method, all of which meet the needs described in the prior art and which meet the previous objectives.

The improved pipe sealing gasket of the invention is designed for receipt within a groove provided within a socket end of a thermoplastic pipe. The gasket has a ring shaped elastomeric body which, when viewed in cross section, has a central bulbous region formed of a suitable elastomer such as a natural or synthetic rubber. The central bulbous region has located therein a planar angled region which bisects the bulbous region at a selected radial location and which extends outwardly from the central region to form a pair of oppositely arranged wing-like flaps. The planar angled region is formed of a dissimilar, resilient material, preferably a suitable plastic material.

The central bulbous region of the gasket forms an oval profile when viewed in cross section. The oval profile has an outer surface region which is adapted to seat within the groove provided in the socket end of a thermoplastic pipe. The oval profile also having an inner surface region which forms a compression seal region for a mating spigot end of a mating thermoplastic pipe during insertion of the spigot end within the mating socket end of the thermoplastic pipe.

The oppositely arranged wing-like flaps which extend outwardly from the central bulbous region form a V-shaped cavity bounded by a leading and a trailing flap, which cavity receives the inner surface region of the central bulbous region of the gasket. The leading flap has an outer edge which makes contact with the spigot pipe end during insertion and wipes any dirt present from the spigot end, keeping the dirt from reaching the cavity and the inner surface region which forms a compression seal region for sealing against the spigot end. The socket end of the female, thermoplastic pipe terminates in a mouth region with the groove being located adjacent the mouth region. The tip of the leading flap is separated from the mouth region of the socket end by a gap, whereby any dirt wiped from the spigot end by the leading flap accumulates in the gap between the flap and the socket.

In the method of forming a pipe joint of the invention, a sealing gasket of the type previously described is prelocated within a groove provided within a female socket end of a first section of pipe in a Rieber style manufacturing process. The spigot end of one section of thermoplastic pipe is then inserted within the socket end of a second pipe section to form a pipe joint. As has been described, the socket end of the thermoplastic pipe terminates in a mouth region with the groove being located adjacent the mouth region, and wherein the tip of the leading flap is separated from the mouth region of the socket end by a gap, and wherein any dirt wiped from the spigot end by the leading flap accumulates in the gap between the flap and the socket. Upon assembly of the joint, the central bulbous region of the gasket forms a compression seal with the mating spigot pipe end and the oppositely extending flaps forming lip seal regions with the spigot pipe end.

In the improved pipe belling method of the invention, a forming mandrel is provided with an inner end and an outer end, the mandrel also having an outer working surface. An improved gasket of the type previously described is installed at a first circumferential position on the outer working surface in a circumferential groove. The socket end of a thermoplastic pipe is then heated and forced over the working surface of the mandrel and over the gasket, whereby the heated socket end of the thermoplastic pipe flows over the gasket to form a retention groove for retaining the gasket. The heated socket end of the thermoplastic pipe is then cooled and the socket end is retracted from the mandrel, whereby the gasket is retained within an internal groove which is formed in the interior of the female, belled pipe end. The unique shape of the improved gasket helps to insure proper positioning of the gasket on the outer working surface of the forming mandrel.

In one form of the invention, the working mandrel is provided with a backup collar at a second circumferential location on the mandrel, the backup collar having an exposed lip portion which initially abuts the gasket. The backup collar is retracted once the heated thermoplastic pipe end is forced over the forming mandrel and the gasket.

In another form of the invention, the belling process is carried out as previously described without the presence of a backup collar on the working mandrel. In this case, the contact between the edges of the opposing flaps of the gasket with the sidewalls of the circumferential groove provided on the forming mandrel facilitates proper positioning of the gasket within the mandrel groove, thereby assuring improved quality control of the pipe belling process.

Additional objects, features and advantages will be apparent in the written description which follows.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

Figure 6:
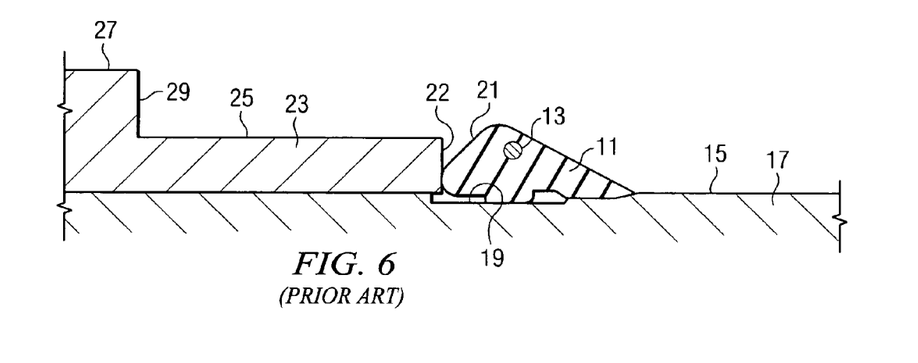
FIGS. 6-9 illustrate the prior art Rieber pipe forming process.
Figure 7:
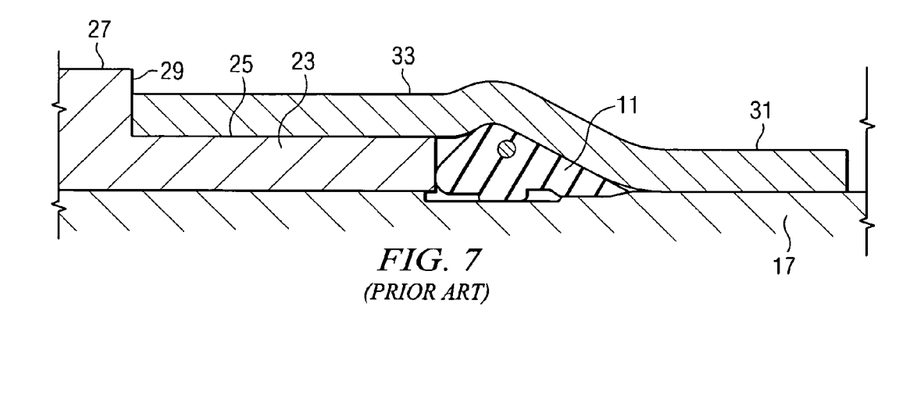
Figure 8:
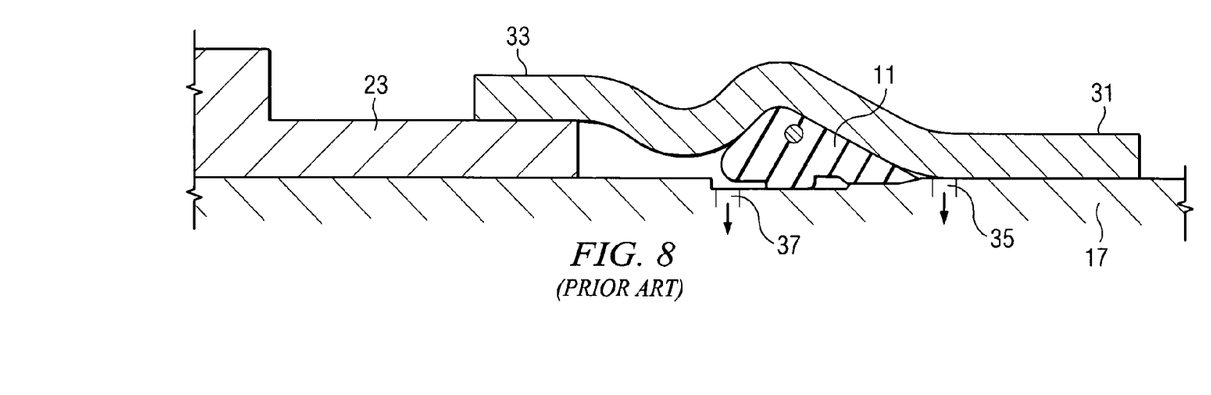
Figure 9:
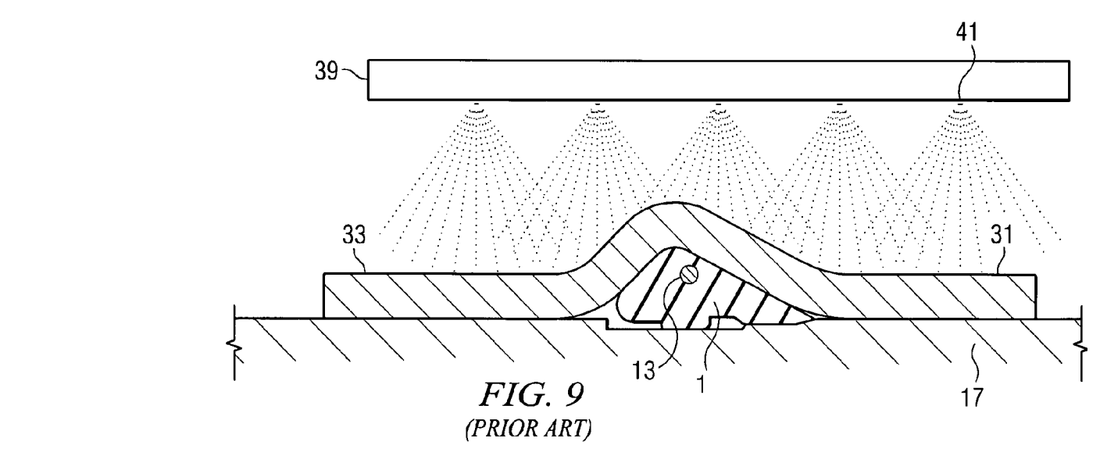

The primary advantages of the present invention can perhaps be best understood with reference to a simplified discussion of the prior art Rieber pipe belling process and with reference to FIGS. 6-9 of the drawings. FIG. 6 shows a section of a conventional elastomeric sealing gasket 11 having a steel reinforcing ring 13 in place on the generally cylindrical outer working surface 15 of the mandrel 17 used in the belling process. The elastomeric gasket 11 can be formed of, for example, rubber and is a ring shaped, circumferential member having an inner compression surface 19 and an exposed nose portion 21 which, as shown in FIG. 6, abuts a backup or forming collar 23. The nose portion 21 forms a sloped contact area for contacting the lip portion 22 of the backup collar 23. The backup collar 23 has a first generally cylindrical extent 25 which is joined to a second cylindrical extent 27 by a step region 29, whereby the second extent 27 is of greater external diameter than the first cylindrical extent 25. The lip portion 22 of the backup collar 23 forms a right angle with respect to the working surface 15 of the mandrel 17.

In the first step of the prior art process, the steel reinforced elastomeric ring 11 is placed onto the working surface of the mandrel 17 and pushed to a position against the back-up or forming collar 23. In this position, the gasket is anchored to the mandrel surface with the rubber between the mandrel and the steel ring of the gasket being compressed by approximately 20%

In the second step of the prior art process, the socket end 33 of the thermoplastic pipe 31 (FIG. 7) is heated and pushed over the steel mandrel 17, gasket 11 and back-up collar 23. The socket end 33 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. The preferred material for the pipe is PVC. The socket end 33 of the PVC pipe flows over the first cylindrical extent 25 of the back-up collar 23 and abuts the step region 29 in the second step of the process.

In the next step of the prior art process (FIG. 8) the mandrel and pipe move away from the back-up collar 23 and the pipe socket end 33 retracts around the mandrel and gasket 11 due to the elastic forces of the thermoplastic material. Typically, vacuum was also applied through ports 35, 37 which connected the mandrel working surface with a vacuum source (not shown).

In the final step of the prior art process (FIG. 9), the pipe socket end 33 is cooled by means of a water spray bar 39 and spray nozzles 41. As the cooling takes place, the pipe socket end 33 shrinks around the gasket 11, thus compressing the rubber body of the gasket between the steel reinforcing ring 13 and the socket-groove to establish a firm seal.

The above described Rieber process has been in commercial use since the early 1970's and is described in the above referenced issued United States patents, among other sources. It will thus be well familiar to those skilled in the thermoplastic pipe sealing arts.

Figure 1:
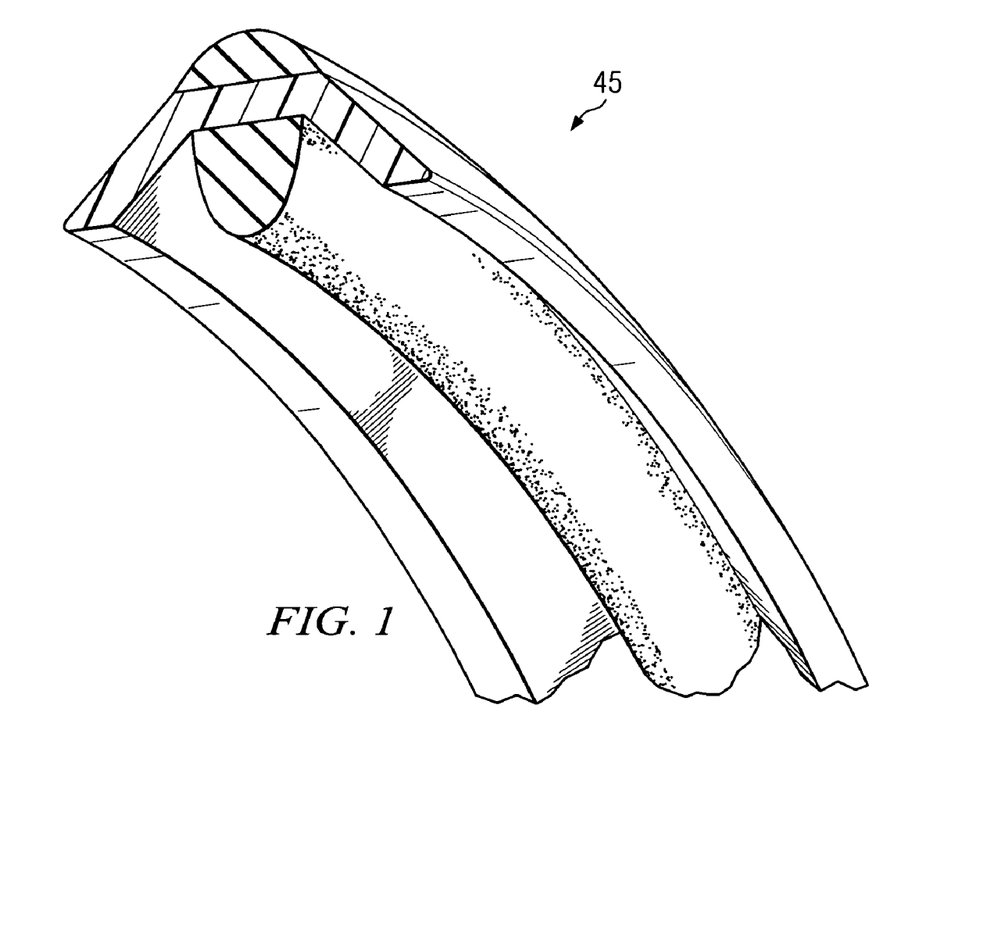
FIG. 1 is a perspective view of a sealing gasket of the invention.
Figure 2:
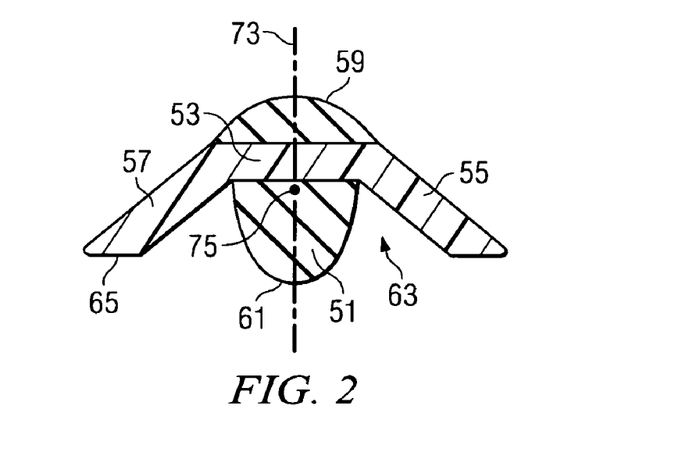
FIG. 2 is a cross sectional view of the sealing gasket of FIG. 1.

Turning now to FIG. 1, there is shown a pipe sealing gasket of the invention, designated generally as 45. The gasket 45 is designed to be received within a groove (47 in FIG. 5) provided within a socket end 49 of a thermoplastic pipe. As will be appreciated from FIG. 1, the sealing gasket 45 of the invention has a ring shaped elastomeric body which is formed of, for example, a natural or synthetic rubber. As shown in FIG. 2, when the body is viewed in cross-section, it has a central bulbous region 51 formed of a suitable elastomer such as a natural or synthetic rubber. The central bulbous region 51 has located therein a planar angled region 53 which bisects the bulbous region 51 at a selected radial location and which extends outwardly from the central region to form a pair of oppositely arranged wing-like flaps 55, 57. The planar angled region is formed of a dissimilar resilient material, such as a suitable plastic material, for example a suitable polyolefin such as polypropylene.

The central bulbous region 51 forms an oval profile when viewed in cross-section (see FIG. 2). The oval profile has an outer surface region 59 which is adapted to seat within the groove (47 in FIG. 5) provided in the socket end 49 of the belled, female pipe end. The oval profile also has an inner surface region 61 which forms a compression seal region for a mating spigot end of a mating thermoplastic pipe during insertion of the spigot end within the mating socket end of the thermoplastic pipe.

As can be seen in FIG. 2, the oppositely arranged wing-like flaps 55, 57 which extend outwardly from the central bulbous region 51 of the gasket form a V-shaped cavity, indicated generally as 63 in FIG. 2, which is bounded by the leading flap 57 and the trailing flap 55. The cavity 63 receives the inner surface region 61 of the central bulbous region 51 of the gasket. The leading flap 57 has an outer edge 65 which makes contact with the spigot pipe end (67 in FIG. 5) during insertion and wipes any dirt present from the spigot end, keeping the dirt from reaching the cavity 63 and inner surface region 61 which forms a compression seal region for sealing against the spigot pipe end 67.

Figure 5:
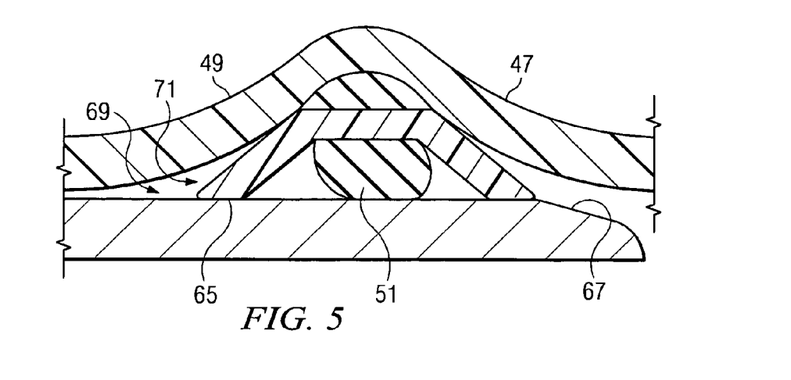
FIG. 5 is a partial cross sectional view of the make-up of a pipe joint, showing the male, spigot pipe end being installed within the belled, female pipe end.

The socket end of the thermoplastic pipe 49, as shown in FIG. 5, terminates in a mouth region, shown generally as 69. The mouth region includes the inner circumferential groove 47 which is located adjacent to the mouth region. The tip of the leading flap 65 is separated from the mouth region of the socket pipe end by a gap 71. As a result, any dirt which is wiped from the spigot end 67 by the leading flap end 65 accumulates in the gap 71 between the flap and the socket.

As shown in FIG. 2, the central bulbous region 51 of the gasket has a radial diameter, indicated by the phantom line 73, and a mid-point 75. The planar angled region 53 bisects the central bulbous region at a pre-defined point on the radial diameter 73 which is less than that of the mid-point 75. The wing-like flaps 55, 57 form downwardly extending projections from the planar angled region 53 and form acute angles with respect to the axis of the radial diameter 73, as viewed in FIG. 2.

Figure 3:
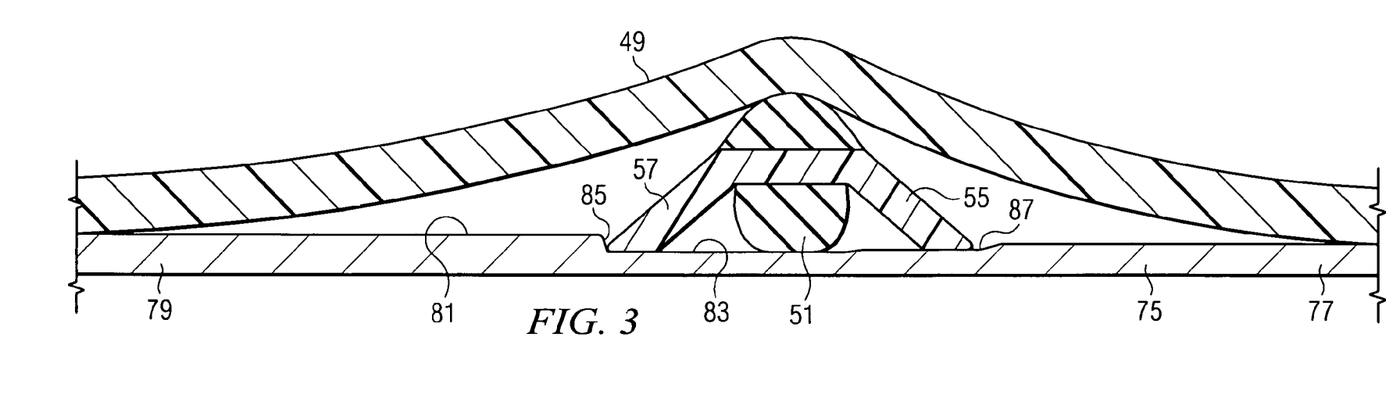
FIG. 3 is a partial sectional view of the gasket of the invention in place on a working mandrel, showing the female thermoplastic pipe end being forced over the mandrel and over the sealing gasket.

The previously described sealing gasket can be used in a method of forming the belled end of a section of thermoplastic pipe which is used to form a pipe coupling. As shown in FIG. 3, a steel forming mandrel 75 is provided with an inner end 77, an outer end 79 and an outer working surface 81. The outer working surface includes a circumferential groove 83 having oppositely arranged sidewall extents 85, 87. As can be seen in FIG. 3, the gasket of the invention is installed on the outer working surface of the mandrel with the central bulbous region 51 contacting the groove 83 and with the winged-like flaps 55, 57 contacting the grooved sidewalls 85, 87 so that the seal locks against the edges of the groove. This insures a more precise seal positioning and ultimately better bell quality. It also simplifies handling since it is not possible to load the seal facing the wrong side of the working mandrel.

Figure 4:
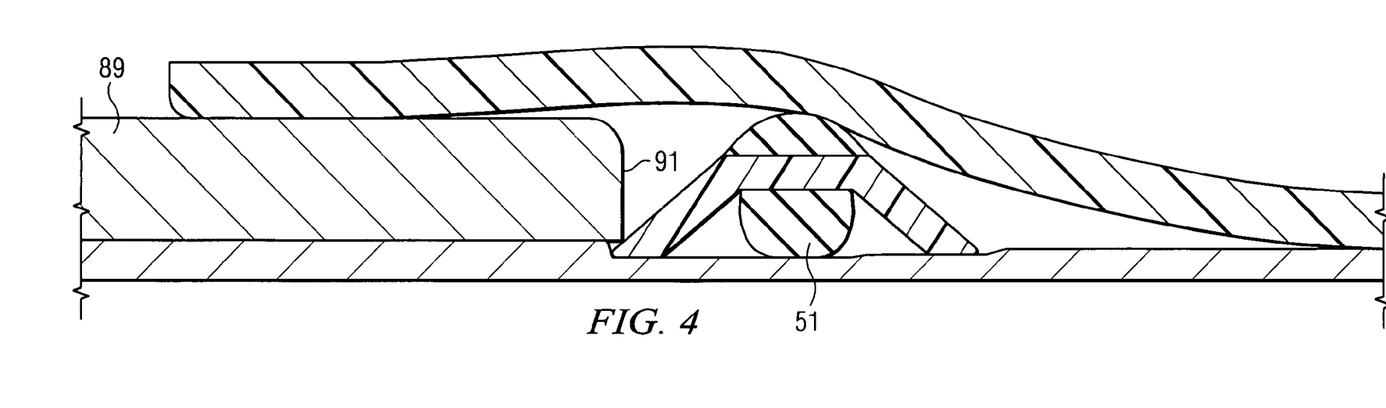
FIG. 4 is a view similar to FIG. 3, but showing the optional use of a backup collar on the working mandrel.

In the next step the method of manufacturing a thermoplastic pipe, the thermoplastic pipe is heated and forced over the working surface of the mandrel and over the gasket, whereby the retention groove (47 in FIG. 5) is formed in the female belled pipe end. The heated socket end 49 of the thermoplastic pipe is then cooled and retracted whereby the gasket is retained within the groove 47 formed in the pipe mouth region. While the improved manufacturing method of the invention has been described with respect to a working mandrel having only a retention groove, it will be appreciated with respect to FIG. 4, that the mandrel may also include a traditional backup collar 89 having an exposed lip portion 91 which initially abuts the gasket of the invention. While the improved sealing gasket of the invention is perfectly capable of use with existing belling machines which feature such a back-up collar 89, it is not necessary to utilize the back-up collar due to the features of the improved design. As a result, once the back-up collar 89 is removed from the process, other seal designs become incompatible with the belling process.

FIG. 5 illustrates in simplified fashion the advantages of the improved pipe joint which is formed using the sealing gasket of the invention. The improved sealing gasket is designed for receipt within a grove provided within a female socket end of a first section of pipe for forming a seal between an internal surface of the female pipe socket (47 in FIG. 5) and a male spigot end 67 of a mating second pipe section. The previously described sealing gasket is first installed within the groove 47. The spigot end 67 is then installed within the belled, female pipe end, as shown in FIG. 5. As the spigot end 67 enters the mouth opening of the female pipe section, the tip of the leading flap 65 of the gasket contacts the spigot pipe end 67 and wipes any dirt or debris from the spigot end before the spigot end contacts the central bulbous region 51 of the gasket. Any debris wiped from the spigot end 67 is generally collected in the gap region illustrated as 71 in FIG. 5. Upon assembly of the joint the central bulbous region 51 forms a compression seal with the mating spigot pipe end 67.

An invention has been provided with several advantages. The improved sealing gasket is simple in design and economical to manufacture. The gasket features a "dual durometer" aspect in that the polypropylene seal core is more rigid than the remainder of the central bulbous region of the gasket. The polypropylene planar, angled region of the gasket replaces rubber at neutral locations for sealing purposes. The new shape enforces a more stable bell shape during subsequent belling operations and improves quality control. The new gasket is compatible with existing belling machines. The tip of the wing-like flaps of the gasket lock against the opposing edges of the retention groove provided on the external working surface of the forming mandrel. This assures precise seal positioning and better bell quality. The particular shape of the new gasket design thereby simplifies handling since it is not possible to load the sealing gasket improperly on the outer surface of the working mandrel.

While the invention has been shown in only one of its forms, it is not thus limited but is susceptible to various changes and modifications without departing from the spirit thereof.

What is claimed is:

1. A pipe sealing gasket designed for receipt within a groove provided within a socket end of a thermoplastic pipe, the gasket comprising:

a ring shaped elastomeric body which, when viewed in cross section, has a central bulbous region formed of a suitable elastomer, the central bulbous region having located therein a planar angled region which bisects the bulbous region at a selected radial location and which extends outwardly from the central region to form a pair of oppositely arranged wing-like flaps, the planar angled region being formed of a dissimilar plastic material;

wherein the central bulbous region forms an oval profile when viewed in cross section, the oval profile having an outer surface region which is adapted to seat within the groove provided in the socket end of a thermoplastic pipe, the oval profile also having an inner surface region which forms a compression seal region for a mating spigot end of a mating thermoplastic pipe during insertion of the spigot end within the mating socket end of the thermoplastic pipe; and wherein the oppositely arranged wing-like flaps which extend outwardly from the central bulbous region form a V-shaped cavity bounded by a leading and a trailing flap, which cavity receives the inner surface region of the central bulbous region of the gasket, and wherein the leading flap has an outer edge which makes contact with the spigot pipe end during insertion and wipes any dirt present from the spigot end, keeping the dirt from reaching the cavity and the inner surface region which forms a compression seal region for sealing against the spigot end.

2. The gasket of claim 1, wherein the socket end of the thermoplastic pipe terminates in a mouth region with the groove being located adjacent the mouth region, and wherein the tip of the leading flap is separated from the mouth region of the socket end by a gap, and wherein any dirt wiped from the spigot end by the leading flap accumulates in the gap between the flap and the socket.

3. The gasket of claim 2, wherein the central bulbous region of the gasket is formed of rubber.

4. The gasket of claim 3, wherein the planar angled region which bisects the central bulbous region is formed of polypropylene.

5. The gasket of claim 4, wherein the central bulbous region of the gasket has a radial diameter with a mid point, and wherein the planar angled region bisects the central bulbous region at a predefined point on the radial diameter which is less than the mid point.

6. A method of forming a pipe joint using a pipe sealing gasket designed for receipt within a groove provided within a female socket end of a first section of pipe for forming a seal between an internal surface of the female socket end and a male spigot end of a mating second pipe section, the method comprising the steps of:

installing a sealing gasket within the groove provided within the female socket end of the first pipe section, the sealing gasket being formed as a ring shaped elastomeric body which, when viewed in cross section, has a central bulbous region formed of a suitable elastomer, the central bulbous region having located therein a planar angled region which bisects the bulbous region at a selected radial location and which extends outwardly from the central region to form a pair of oppositely arranged wing-like flaps, the planar angled region being formed of a dissimilar plastic material;

wherein the central bulbous region of the sealing gasket forms an oval profile when viewed in cross section, the oval profile having an outer surface region which is adapted to seat within the groove provided in the socket end of a thermoplastic pipe, the oval profile also having an inner surface region which forms a compression seal region for a mating spigot end of a mating thermoplastic pipe during insertion of the spigot end within the mating socket end of the thermoplastic pipe;

wherein the oppositely arranged wing-like flaps which extend outwardly from the central bulbous region form a V-shaped cavity bounded by a leading and a trailing flap, which cavity receives the inner surface region of the central bulbous region of the gasket, and wherein the leading flap has an outer edge which makes contact with the spigot pipe end during insertion and wipes any dirt present from the spigot end, keeping the dirt from reaching the cavity and the inner surface region which forms a compression seal region for sealing against the spigot end; and installing the spigot end of one thermoplastic pipe section within the socket end of a second pipe section to form a pipe joint.

7. The method of claim 6, wherein the socket end of the thermoplastic pipe terminates in a mouth region with the groove being located adjacent the mouth region, and wherein the tip of the leading flap is separated from the mouth region of the socket end by a gap, and wherein any dirt wiped from the spigot end by the leading flap accumulates in the gap between the flap and the socket.

8. The method of claim 7, wherein, upon assembly of the joint, the central bulbous region of the gasket forms a compression seal with the mating spigot pipe end and the oppositely extending flaps forming lip seal regions with the spigot pipe end.

9. A method of installing a gasket in a socket end of a thermoplastic pipe which is used to form a pipe coupling, the method comprising the steps of:

providing a mandrel with an inner end and an outer end and having an outer working surface;

installing a gasket at a first circumferential position on the outer working surface;

heating a socket end of the thermoplastic pipe; forcing the heated socket end of the thermoplastic pipe over the working surface of the mandrel and over the gasket and backup collar, whereby the heated socket end of the thermoplastic pipe flows over the gasket to form a retention groove for retaining the gasket;

cooling the heated socket end of the thermoplastic pipe;

retracting the cooled socket end of the thermoplastic pipe and the retained gasket from the working surface of the mandrel;

wherein the gasket is a ring shaped elastomeric body which, when viewed in cross section, has a central bulbous region formed of a suitable elastomer, the central bulbous region having located therein a planar angled region which bisects the bulbous region at a selected radial location and which extends outwardly from the central region to form a pair of oppositely arranged wing-like flaps, the planar angled region being formed of a dissimilar plastic material;

wherein the first circumferential region provided on the working surface of the mandrel comprises a circumferential groove having opposing sidewalls, and wherein the oppositely arranged wing-like flaps which extend outwardly from the central bulbous region form a V-shaped cavity bounded by a leading and a trailing flap, which cavity receives the inner surface region of the central bulbous region of the gasket, and wherein the flaps each have an outer edge which makes contact with the sidewall regions of the mandrel groove to thereby lock the sealing gasket within the circumferential groove provided on the working surface of the mandrel.

10. The method of claim 9, further comprising the steps of:
providing a backup collar at a second circumferential location on the mandrel, the backup collar having an exposed lip portion which initially abuts the gasket;
wherein the backup collar is retracted once the heated thermoplastic pipe end is forced over the forming mandrel and the gasket.

11. The method of claim 9, wherein the heated thermoplastic pipe end is forced over the forming mandrel and gasket with no backup collar being present on the mandrel.

12. The method of claim 9, wherein the contact between the edges of the opposing flaps with the sidewalls of the circumferential groove provided on the forming mandrel facilitates proper positioning of the gasket within the mandrel groove, thereby assuring improved quality control of the pipe belling process.

13. The method of claim 12, further comprising the step of:
applying a vacuum to the heated, socket end of the thermoplastic pipe after the pipe has been forced over the working surface of the gasket and mandrel to thereby force the heated, socket end to contract about the mandrel and gasket.

14. The method of claim 13, wherein the heated thermoplastic pipe is cooled by a water spray after the mandrel is retracted.

* * * * *